US009248468B2

(12) United States Patent
Bulluck

(10) Patent No.: US 9,248,468 B2
(45) Date of Patent: Feb. 2, 2016

(54) ULTRAVIOLET LIGHT CURING COMPOSITIONS FOR COMPOSITE REPAIR

(75) Inventor: John W. Bulluck, Spicewood, TX (US)

(73) Assignee: Texas Research International, Inc., Austin, TX (US)

( * ) Notice: Subject to any disclaimer, the term of this patent is extended or adjusted under 35 U.S.C. 154(b) by 537 days.

(21) Appl. No.: 12/930,826

(22) Filed: Jan. 18, 2011

(65) Prior Publication Data

US 2011/0287190 A1    Nov. 24, 2011

Related U.S. Application Data

(60) Provisional application No. 61/336,055, filed on Jan. 15, 2010.

(51) Int. Cl.
| | |
|---|---|
| *C08F 2/48* | (2006.01) |
| *B05D 3/06* | (2006.01) |
| *B05D 3/04* | (2006.01) |
| *C08J 3/28* | (2006.01) |
| *C08F 220/06* | (2006.01) |
| *C08F 220/14* | (2006.01) |
| *C08F 220/16* | (2006.01) |
| *C08F 222/10* | (2006.01) |

(52) U.S. Cl.
CPC ............ *B05D 3/067* (2013.01); *B05D 3/0493* (2013.01); *C08J 3/28* (2013.01); *B05D 2202/10* (2013.01); *B05D 2202/25* (2013.01); *C08F 220/06* (2013.01); *C08F 220/14* (2013.01); *C08F 220/16* (2013.01); *C08F 222/1006* (2013.01); *C08J 2363/00* (2013.01)

(58) Field of Classification Search
CPC .. B05D 3/067; B05D 3/0493; B05D 2202/10; B05D 2202/25; C08J 3/28; C08J 2363/00; C08F 220/06; C08F 220/14; C08F 220/16; C08F 222/1006
USPC .................................................. 427/510, 508
See application file for complete search history.

(56) References Cited

U.S. PATENT DOCUMENTS

| | | | |
|---|---|---|---|
| 4,008,341 A * | 2/1977 | Kehr | .............................. 427/516 |
| 4,323,591 A | 4/1982 | Wendling et al. | |
| 4,737,593 A | 4/1988 | Ellrich et al. | |
| 5,166,007 A | 11/1992 | Smith et al. | |
| 5,399,770 A | 3/1995 | Leppard et al. | |
| 5,472,992 A | 12/1995 | Leppard et al. | |
| 5,767,169 A | 6/1998 | Leppard et al. | |
| 5,854,298 A | 12/1998 | McNay et al. | |
| 6,099,783 A | 8/2000 | Scranton et al. | |
| 6,149,856 A | 11/2000 | Zemel et al. | |
| 6,284,360 B1 | 9/2001 | Johnson et al. | |
| 6,319,433 B1 | 11/2001 | Kohan | |
| 6,339,113 B1 | 1/2002 | Han et al. | |
| 6,350,792 B1 | 2/2002 | Smetana et al. | |
| 6,372,827 B2 | 4/2002 | Johnson et al. | |
| 6,406,782 B2 | 6/2002 | Johnson et al. | |
| 6,486,228 B2 | 11/2002 | Kohler et al. | |
| 7,144,544 B2 | 12/2006 | Bulluck et al. | |

(Continued)

*Primary Examiner* — Robert S Walters, Jr.
(74) *Attorney, Agent, or Firm* — Egan. Peterman, & Enders LLP

(57) ABSTRACT

Methods and compositions concerning an ultraviolet light curable formulation useful for repairing composite materials including the repair of a hole in the exterior of an airplane. The formulation may contain an acrylic oligomer, an acrylic monomer, an organic peroxide, a dialkylaniline promoter, a photoinitiator. The formulation can include a filler such as carbon fabric or Kevlar fabric.

22 Claims, 2 Drawing Sheets

(56) References Cited

U.S. PATENT DOCUMENTS

| | | |
|---|---|---|
| 7,276,542 B2 | 10/2007 | Bulluck et al. |
| 7,291,656 B2 | 11/2007 | Bulluck et al. |
| 7,291,657 B2 | 11/2007 | Bulluck et al. |
| 2002/0028288 A1 | 3/2002 | Rohrbaugh et al. |
| 2002/0086161 A1 | 7/2002 | Smetana et al. |
| 2006/0229378 A1* | 10/2006 | Bulluck et al. .............. 522/77 |
| 2008/0023131 A1* | 1/2008 | Pressley .............. 156/273.7 |
| 2010/0260941 A1 | 10/2010 | Bushmire et al. |

* cited by examiner

ULTRAVIOLET LIGHT CURING COMPOSITIONS FOR COMPOSITE REPAIR

This application claims priority to U.S. provisional application Ser. No. 61/336,055, filed Jan. 15, 2010, incorporated in its entirety herein.

BACKGROUND OF INVENTION

This invention pertains to a UV light curable composition which may comprise an acrylic oligomer, an acrylate monomer, a photoinitiator, and a filler such as Kevlar and carbon.

Rapid, high-quality, on-aircraft repair techniques for composite components are desirable. However, current field level repair techniques use thermally accelerated adhesive bonding to restore the original design strength of the composite laminate. In practice, several problems exist with on-aircraft thermally cured repair methods. Airframe structural members act as heat sinks, and make it difficult to obtain a uniform cure temperature profiles. Excessive power requirements can result from efforts to offset this heat sinking effect. Also, commonly used resin systems require low temperature storage to avoid premature degradation, increasing storage cost and support complexity. Furthermore, the thermally accelerated require heat blankets for cure that can be difficult to work with depending on the size and geometry of the aircraft part being repaired.

U.S. Pat. No. 7,144,544 discloses compositions including fiberglass that meet these needs. However, this patent discloses that composite compositions containing Kevlar did not cure below the Kevlar when exposed to UV light. It would be desirable to find curable compositions that include Kevlar or Carbon particles or fabric layers.

SUMMARY OF INVENTION

The present invention provides a solution to one or more of the problems and deficiencies in the prior art. For example, this invention provides an ultraviolet light curable resin system that can nullify the problems and deficiencies identified above while retaining the necessary strength and adhesion requirements for a composite repair.

In one broad respect, this invention is an ultraviolet light curable formulation useful for repairing composite materials, comprising: an acrylic oligomer, an acrylic monomer, an organic peroxide, a dialkylaniline promoter, a photoinitiator. The formulation can include a filler such as carbon fabric or Kevlar fabric.

In another broad respect, this invention is a reaction product formed by irradiation of the UV curable composition or the UV curable formulation or of the UV curable composition that includes a filler.

In another broad respect, this invention is a method which comprises: combining an acrylic oligomer, an acrylic monomer, an organic peroxide, a dialkylaniline promoter, and a photoinitiator, applying the resulting ultraviolet light curable formulation to a filler to thereby form an ultraviolet light curable composition.

In another broad respect, this invention is a method of repairing a hole in the exterior of an airplane, comprising: applying alternating layers of (1) an ultraviolet light curable formulation and (2) a filler fabric to fill the hole and to form an ultraviolet light curable composition; creating a vacuum across at least one side of the ultraviolet light curable composition; irradiating the ultraviolet light curable formulation with ultraviolet light to cure the formulation to produce a cured composition; and removing the vacuum, wherein the ultraviolet curable formulation comprises an acrylic oligomer, acrylate monomers, peroxide, amine promoters, photoinitiators, and acrylate monomers.

The vacuum can be applied using known, conventional procedures. Similarly, the UV radiation can be supplied with conventional equipment and depending on the UV curable composition can be effected by sunlight. The hole to be repaired can be of a variety of depths and widths.

In general the width can be up to two feet and typically up to one foot, and the depth can be up to about 200 mils (0.2 inch), typically up to about 150 mils (0.15 inch), and typically in the range from about 10 to about 150 mils. It should be appreciated that the hole or damaged area can be partially through a given composite piece to be repaired or can be completely through the piece such as in the case of a hole through a portion of a wing or fuselage. The damaged area is typically damage to the exterior skin of the composite, though portions of the core may also be repaired using the UV curable composition. It should also be noted that the shape of the portion of the composite to be repaired can be of essentially any shape, and vary widely depending on how the damage to the composite material of the aircraft or other structure built of a composite material is damaged. In one embodiment, the repair can be performed on structures formed of Nomex honeycomb cores with thin skins, such as a structure with an aluminum core and aluminum alloy skins or an aluminum core with fiberglass-reinforced or carbon fiber-reinforced epoxy skins (sometimes referred to as having, for example, fiberglass facings). The materials to be repaired in accordance with repaired are composite materials, such as those made of using a honeycomb structure and/or made of carbon composite materials. The hole to be repaired is at least partially filled with the curable composition and then cured with UV radiation. In some cases it may be desirable or necessary to remove a skin layer so that the UV curable composition or UV curable formulation may be applied to the core rather than to an epoxy skin, so as to increase bonding and/or to enable the repair patch to have the same height as the skin; that is, to provide a repair area that is substantially similar in depth to the original epoxy skin. After exposing an additional portion of the core by removing a portion of the undamaged skin, a thin layer of UV curable formulation is applied, upon which alternating layers of filler and UV curable formulation are applied (the top layer is UV curable formulation) to form the UV curable composition (i.e., a composite) having alternating layers of filler and UV curable formulation. It may be desirable to at least partially shade the area where the layers are applied so that ambient UV light does not prematurely initiate cure. A vacuum bagging procedure, well known to one of skill in the art, may be employed to reduce the amount of bubbles in the final cured composition. A bagging procedure may include a number of layers of material over the UV curable composition, such as a layer of Teflon film, a layer of filler, a perforated Teflon layer, fiberglass cloth, non-porous Nylon 66 separator film, a layer of breather cloth, and the vacuum bag to which is attached the vacuum source. Typically the vacuum bagging is performed at ambient temperatures. Similarly, the area may be tamped prior to irradiation to remove at least a portion of trapped air bubbles. In one embodiment, the vacuum is maintained during UV curing.

The UV cure resins of this invention do not require heating. Also, long ambient temperature storage is possible with the present invention. By the practice of this invention, cure times can be significantly reduced relative to current methods, thus increasing aircraft availability and reducing repair cost.

The main problem contemplated by the inventors was that for a UV cured approach, the difficulty is in developing a resin system with sufficient high temperature tolerance. In addition, it would be desirable for some applications if the methods for on-aircraft cure of UV resins matched the results of thermally cured resins in terms of uniform physical properties. The inventors herein sought to provide a UV cure repair solution that includes resin systems, reinforcements, vacuum bagging materials, UV illumination sources, and detailed repair procedures.

This invention provides a number of advantages over the current epoxy resin products and these advantages are detailed below. These advantages include: quick cure times on the order of minutes instead of hours; sunlight-only cures are possible; no frozen storage required; simple to apply such as being similar to ordinary epoxy resin wet layup systems; ability to cure through relatively thick bagging schedules, as long as no UV radiation blocking layer(s) are used; only a mild acrylic odor present and no styrene emission problems; easy to clean up with common solvents; no expensive and fragile hot bonders needed for field level repairs; no programming of hot bonders, with knowledge of specific ramp rates, soak times, alarm thresholds, etc., needed by the repair technician; no possibility of a runaway heat blanket with attendant fire risk; no thermocouples required; the strength of cured resins are similar to conventional epoxies, and the compositions are capable of fully curing when using an opaque filler such as Kevlar and carbon.

DETAILED DESCRIPTION OF THE INVENTION

Figure 1:
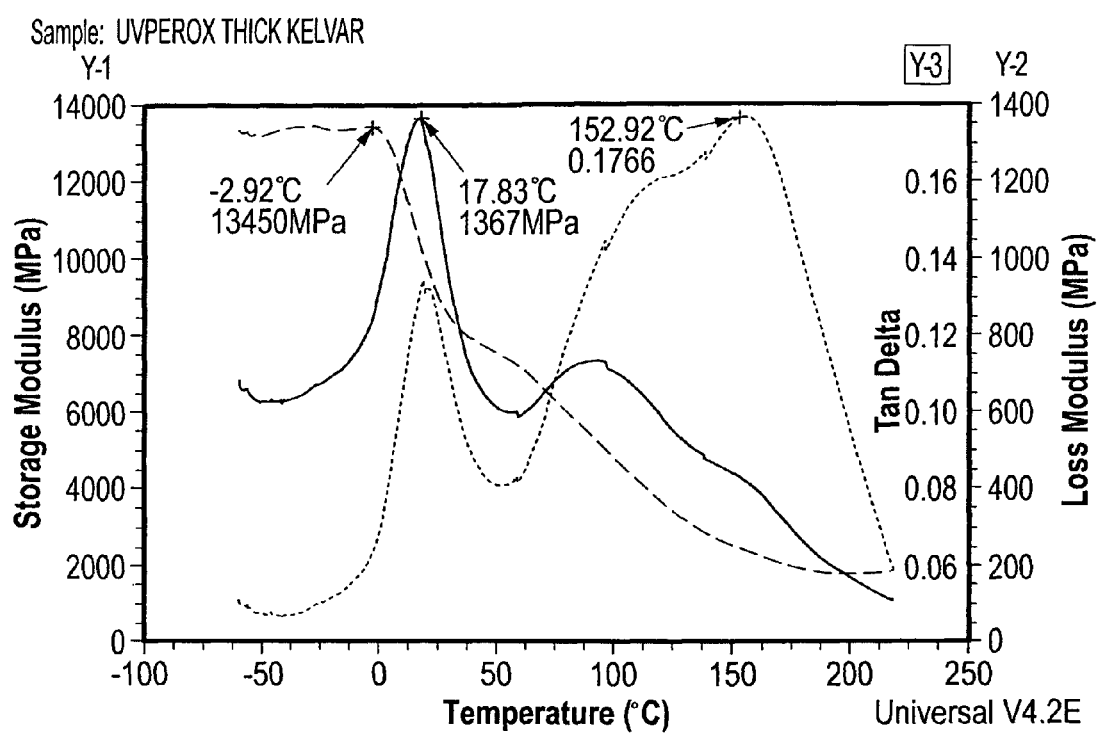
FIG. 1 illustrates the dynamic mechanical analysis for glass transition temperature of a thick Kevlar™ composite which had a tan delta peak at 153° C.

As discussed above the formulations of this invention include one or more oligomers, one or more monomers, one or more photoinitiators, one or more organic peroxides, and one or more dialkylanilines. A filler such as Kevlar can be admixed with the formulation, or layers of formulation and filler can be formed. Aircraft may be repaired using standard vacuum bagging procedures, which reduces the amount of voids and detrimental effects of oxygen during cure. Standard UV lighting equipment may be employed. Several layers may be built up and simultaneously irradiated to effect curing. The formulations herein have the unique and surprising benefit of being able to fully cure despite having several layers opaque to visible light including Kevlar and carbon.

Oligomers

The acrylated oligomers that may be used in this invention can vary widely, and may include a variety of backbone structures in addition to the acrylate moiety, such as urethane, epoxy, and polyester functionality. An oligomer is generally referred to as a polymeric unit containing two to four, possibly more, monomer units. An oligomer is typically composed of only a few monomer units such as a dimer, trimer, tetramer, etc., or their mixtures. The upper limit of repeating units in an oligomer is usually considered to be about twenty. The term telomer is sometimes used synonymously with oligomer. Oligomers are typically higher molecular weight (1,000-30,000 g/mol) crosslinkable coating components used as the base material in a coatings formulation. The primary job of the oligomer is to impart the major physical properties of the finished coating. The oligomers employed in this invention are based on a variety of chemistries, including acrylated urethanes, epoxies, polyesters and acrylics. The acrylated oligomers used in UV/EB radical polymerization are typically viscous liquids ranging from a few thousand centipoise to greater than one million centipoise in viscosity at 25 C. The acrylated oligomers typically possess two to six acrylate groups per molecule and range in molecular weight from approximately 500 to 20,000 g/mol.

In acrylate chemistry there are several families of oligomers. Each particular family has both advantages and disadvantages. The primary oligomer families are generally referred to as epoxy acrylates, urethane acrylates, polyester acrylates, polyether acrylates, amine modified polyether acrylates, and acrylic acrylates.

A representative sample of suitable acrylates is provided in Table 1.

TABLE 1

Various Acrylic Oligomers for Resin Formulation

| Tradename | Type | Manufacturer | $T_g$ (° C.) |
| --- | --- | --- | --- |
| CN975 | Hexafunctional urethane acrylate | Sartomer | 29 |
| CN104 | Epoxy acrylate | Sartomer | 67 |
| CN120 | Epoxy acrylate | Sartomer | 60 |
| CN151 | Epoxy methacrylate | Sartomer | 68 |
| BR-941 | Hexafunctional aliphatic urethane acrylate | Bomar | 83 |
| BR-970 | Aliphatic urethane acrylate | Bomar | N/A |
| BR-990 | Trifunctional urethane acrylate | Bomar | 20 |
| Genomer 4302 | Aliphatic polyester triurethane triacrylate | Rahn | 40 |
| Genomer 2252 | Acrylated bisphenol A epoxy resin | Rahn | N/A |

Epoxy acrylate oligomers impart high gloss, hardness, fast cure, pigment wetting and chemical resistance to coatings. As with the use of monomers, molecular weight, functionality and chemical nature of the epoxy acrylate also allow variability within the same class of materials. Urethane acrylate oligomers provide excellent weatherability in the case of aliphatic products, as well as abrasion resistance, scratch resistance, impact resistance and flexibility.

One of the principal roles of the oligomer species is to promote adhesion of the resin to the filler of the composite, as well as increase the tensile strength and toughness by reducing brittleness. As such, choice of the oligomer is important in the practice of this invention. Typically, these properties are achieved at the expense of having lower (<50° C.) glass transition temperatures ($T_g$). Acrylated oligomers used in this invention generally form cured compositions that have a Tg in the range of 100 to 175° C. This invention provides a composition (a cured composite) that will withstand excess temperatures (>150° C., as this is the upper service temperature, e.g. 175° C.).

Aromatic difunctional epoxy acrylate oligomers may be used in one embodiment of this invention, and in one respect difunctional epoxy acrylate oligomers derived from bisphenol A may be employed. This type of oligomer has very low molecular weight that gives them some very desirable properties including, high reactivity, high gloss, high glass transition, high strength, and low physiological irritation. The cost of these products is very low. This makes these types of oligomers suitable for a wide variety of applications, ranging from overprint varnishes for paper and board to wood coatings for furniture and parquet flooring, but also high tech applications like compact disk coatings and optical fiber coatings. Their main drawbacks are high viscosity, some long-term yellowing, and limited flexibility. Because of this, they are less suitable for application on flexible substrates; low viscosity application techniques like spray-, dip-, curtain coating, and applications with high requirements in terms of color stability over a longer period of time (white and light colored substrates that have to last long).

In the absence of fiberglass, the UV curable formulations (oligomers, monomers, and photoinitiators) generally have an amount of acrylic oligomer in the range from about 20 to about 70 percent by weight, and in one embodiment is an amount in the range from about 20 to 60 percent by weight. As used herein, "UV curable formulation" or "curable resin" refer to a formulation containing oligomers, monomers, organic peroxide, dialkylaniline promoter, and photoinitiators, but which does not contain filler. By contrast, as used herein a UV curable composition refers to a combination of the formulation with fiberglass, such as by layering formulation and filler sheets to form monolithic structures that can include multiple layers of filler sheets.

Monomers

In order to raise the glass transition temperatures of the cured composite resins, the aforementioned oligomers must be successfully copolymerized with one or more monomers known to have high $T_g$'s (such as those listed in Table 2), resulting in an overall resin system with a high $T_g$ while retaining the necessary toughness that is desired for composite strength. The monomers used in this invention are typically capable of raising the $T_g$ of the cured resin to above 150° C.

The acrylic monomers used in this invention can be monofunctional, difunctional, and trifunctional acrylic, acrylate and methacrylate monomers. Representative examples of such monomers include but are not limited to: methyl methacrylate (MMA), ethyl methacrylate, methacrylic acid (MA), isobornyl methacrylate (ISBM), ethylene glycol dimethacrylate (EGDM), ethoxylated bisphenol A diacrylate esters (BPADAE), tetraethylene glycol dimethacrylate (TEGDM), diethylene glycol dimethacrylate (DEGDM), diethylene glycol diacrylate (DEGDA), tris(2-hydroxyethyl)isocyanurate triacrylate (ISOTRI) as well as the diacrylate, alkyl (such as isodecyl, butyl, methyl, tetrahydrofurfuryl, and 2-ethylhexyl) or hydroxy alkyl (such as hydroxy ethyl and hydroxy propyl) esters of acrylic acid and methacrylic acid, butyleneglycol diacrylate and triacrylate, 1,6-hexanediol diacrylate, tetraethyleneglycol diacrylate and triacrylate, polyethylene glycol diacrylate and triacrylate, bisphenol A diacrylate and triacrylate, pentaerythritol diacrylate and triacrylate and tetraacrylate; alkyl and hydroxyalkyl acrylates and methacrylates, e.g. methyl, ethyl, butyl, 2-ethylhexyl and 2-hydroxyethyl acrylate, isobornyl acrylate, ethylene glycol diacrylate, propylene glycol diacrylate, neopentyl glycol diacrylate, hexamethylene glycol diacrylate, 4,4'-bis(2-acryloyloxyethoxy)diphenylpropane, trimethylolpropane triacrylate, and vinyl acrylate. Combinations of these monomers may also be employed. Likewise, one or more of these monomers may be excluded. Other monomers may be included in the curable composition of this invention depending on the end use and desired properties of the cured resin.

TABLE 2

Acrylic Monomers for Resin Formulation

| Component | Type | Manufacturer | $T_g$ (° C.) |
|---|---|---|---|
| SR 368 | Tris(2-hydroxyethyl) isocyanurate triacrylate | Sartomer | 272 |
| SR 423 | Isobornyl methacrylate | Sartomer | 110 |
| Genomer 1223 | 1,6 Hexanediol diacrylate | Rahn | 43 |
| SR 444 | Pentaerythritol triacrylate | Sartomer | 103 |
| | Methacrylic acid | Aldrich | 216 |
| | Methyl methacrylate | Aldrich | 105 |

Monomers are used as reactive diluents in some formulations. Monomers can also be used to achieve a number of desired properties including glass transition, adhesion, reactivity, chemical resistance, scratch resistance, and strength. Thus, selection of a given monomer can depend on one or more of these criteria. A higher amount of functionality of the monomer results in higher reactivity. A lower amount of functionality results in lower shrinkage and better adhesion. Generally the lower the molecular weight the lower the viscosity. Combinations of monomers can be used in the practice of this invention to achieve desired final properties of the cured resin.

In the absence of filler, the UV curable formulations (oligomers, monomers, organic peroxide, dialkylaniline promoter, and photoinitiators) generally have an amount of one or more acrylic oligomers in the range from about 20 to about 90 percent by weight, and in one embodiment is an amount in the range from about 30 to about 80 percent by weight, and in a second embodiment in the range from about 40 to about 75 percent by weight. Typically, two or more monomers are employed; and in one embodiment the two or more monomers are a combination of ISOTRI, ISBM, MMA, and MA.

Photoinitiators

Photoinitiators are chemicals that form energetic radical species when exposed to UV light. They are essential ingredients in UV-curable coatings in order to obtain polymerization. Depending on factors such as film thickness, UV-light source and particular coating performance requirements, the amount of photoinitiator in a UV-coating formulation can range from approximately 0.5 to 15%. Photoinitiator systems are available that meet the particular requirements for curing very thin clear coatings, thin pigmented coatings, and very thick clear coatings.

Representative photoinitiators include but are not limited to those listed in Table 3. A particularly effective system in the practice of this invention is a 3:1 ratio of an acylphosphine (such as phenylbis(2,4,6-trimethylbenzoyl)-phenylphosphineoxide, available commercially as Irgacure 819) to phenyl ketone (such as 1-hydroxy-cyclohexyl-phenyl ketone, available commercially as Irgacure 184), which has shown to be very effective in thoroughly curing composite samples, even those approaching 5.0 mm in thickness. Photoinitiator concentrations typically range from about 0.5 to about 3.0 percent by weight of the UV curable formulation. The bis-acylphosphine oxide and the α-hydroxy ketone combination of photoinitiators were found to be very effective because of their ability to initiate cure in thick sections of a composite formed from resin and filler layers.

TABLE 3

Various Photoinitiators for Resin Formulation

| Initiator | Type | Manufacturer |
| --- | --- | --- |
| Irgacure 819 | Acylphosphine oxide[a] | Ciba |
| Irgacure 184 | Phenyl ketone | Ciba |
| Irgacure 2020 | Mixture of a phosphine oxide and a hydroxy ketone[b] | Ciba |
| ITX | Benzophenone derivative | First Chemical |

[a]Irgacure 819 is phenylbis(2,4,6-trimethylbenzoyl)-phenylphosphineoxide.
[b]Irgacure 2020 is a mixture of 20% phenylbis(2,4,6-trimethylbenzoyl)-phosphine oxide) and 80% 2-hydroxy-2-methyl-1-phenyl-propan-1-one.

A variety of photoinitiators can be used in the practice of this invention. Representative, non-limiting examples of the photoinitiators include benzophenone derivatives, acylphosphine oxide, bis-acylphosphine oxide, and α-hydroxy ketone. Representative non-limiting examples of α-hydroxy ketones include 2-hydroxy-2-methyl-1-phenyl-propan-1-one, 1-[4-2-hydroxyethoxy)-phenyl]-2-hydroxy-2-methyl-propane-1-one, 1-hydroxycyclohexylphenylketone, camphorquinone, and combinations thereof. Bis-acylphosphine oxides and acylphosphine oxides are well known materials that are disclosed, for example, in U.S. Pat. Nos. 4,737,593; 4,792,632; 5,399,770; 5,472,992; and 6,486,228. A representative non-limiting example of an acylphosphine oxide is diphenyl(2,4,6-trimethylbenzoyl)phosphine oxide. A representative non-limiting example of a bisacylphosphine oxide is phenylbis(2,4,6-trimethylbenzoyl)-phenylphosphineoxide.
Combinations of bisacylphosphine oxide and acylphosphine oxides can be employed, such as a combination of diphenyl (2,4,6-trimethylbenzoyl)phosphine oxide and phenylbis(2,4,6-trimethylbenzoyl)-phenylphosphineoxide. It is important that the photoinitiator be capable of facilitating the UV curing through the one or more layers of composition, which can be readily determined by one of skill in the art.

In one embodiment of this invention, the photoinitiator is bis-acylphosphine oxide, α-hydroxy ketone, or a mixture thereof.

In the absence of filler, a curable formulation will typically have 0.5 to about 3 percent of one or more photoinitiators. In the absence of filler, a curable formulation will typically have 0.5 to about 3 percent of two or more photoinitiators such as a mixture of bis-acylphosphine oxide and alpha hydroxy ketone, or combination thereof.

Organic Peroxides and Promoters

It has been found that by using organic peroxide and certain promoters, the curable formulations of this invention can be UV cured when using opaque fillers such as Kevlar and carbon. In compositions that include photoinitiators but not an organic peroxide and a promoter, the top portion will cure, but the formulation below the Kevlar layer does not cure.

The organic peroxides used in this invention vary, typically being hydrocarbon peroxides have 10 to 20 carbon atoms. Owing to its low cost, availability, and efficacy, benzoyl peroxide is currently a preferred peroxide. The organic peroxide in the curable formulation is typically present in an amount from 0.01 to 1 percent based on the total weight of the curable formulation. In one embodiment the amount is 0.3 to 0.5 percent. In another embodiment the amount is about 0.4 percent.

The promoters used in this invention are typically dialkylanilines. Representative examples of such promoters include but are not limited to dimethylaniniline, diethylaniline, dipropylinine, and combinations thereof. Owing to its low cost, availability, and efficacy, dimethylaniline is currently preferred. The amount of promoter is typically from 0.01 to 0.25 percent weight of the formulation. In one embodiment the amount is 0.01 to 0.1 percent. In another embodiment the amount is about 0.05 percent based on the total weight or the curable formulation.

While not wishing to be bound by theory, it is believed currently that the UV light generates both thermally and photoinitiated radicals in the formulation top layers. The UV generated free radicals in the top layers in turn propagate causing free radical polymerization, in conjunction with thermal initiated bulk curing of curable laminates. The propagation and thermal bulk curing are enhanced by the organic peroxide and dialkylaniline so that resin below an opaque filler layer, such as a carbon or Kevlar layer, fully cures. This result is an advance over prior systems that used only photoinitiators and that did not cure beneath an opaque filler layer.

Fillers

Fillers may be included in the UV curable compositions of this invention. The fillers may be incorporated a variety of ways. For example, particles (or fibers, or fabrics in a variety of shapes and sizes, including unidirectional or fabric) can be admixed with a resin formulation to provide a heterogeneous mixture of curable formulation, and filler.

The fillers can vary widely. Representative examples of fillers and fabrics made from these materials that are used in this invention include but are not limited to fiberglass, quartz, carbon, and Kevlar (para-aramid).

Typically, alternating layers of resin and woven filler fabrics are employed. In this embodiment, a structure that may be considered to be multilayered can be formed by applying a layer of resin to a woven filler layer, placing another layer of woven filler on the resin layer, applying a layer of resin to the second filler layer, and so on. In this way, a multilayered structure with alternating resin and filler layers are built up. It should be appreciated that the filler layer becomes wetted out, thus there may not be discrete layers per se. Using fabric as opposed to other reinforcement insures the highest weight to strength ratio possible for the resultant laminate. The number of such layers employed may vary depending on the intended end us, size of the overall composition, and so on. After the desired numbers of layers are built up, the composition that now contains filler and curable resin (the UV curable formulation) can be irradiated with UV light to effect curing. Owing to the photoinitiators, organic peroxide, and dialkylaniline used in the practice of this invention, the structure can thereby be cured. The time required to effect curing may vary depending on a variety of factors such as amount of resin, layers of resin, temperature, type of formulation, strength and type of the UV light source or wavelengths, and so on. In general, the time required to effect curing may be less than one hour. This time is dramatically less than the time required for the widely used thermally curable materials employed today for aircraft composite repair.

When the UV curable composition is used to repair composite materials such as in some modern aircraft wings and exterior skin, the UV curable composition is typically subjected to curing in a "vacuum bagging" procedure. In this regard, the composition is covered with plastic (typically on one side only) and a vacuum is pulled on the bag. In this way a vacuum is maintained over at least one surface of the composition. The part being bagged is subjected to a compressive force that minimizes voids. This facilitates the composition to be cured with minimal production of voids in the cured product. Such bagging procedures are well known to those skilled in the art of composite repair, particularly for composite repair of airplanes.

Several representative woven glass fibers as well as their weaves and sizings are shown below in Table 4.

TABLE 4

Woven Glass Fiber obtained for Composite Formulation

| Glass Fiber # | Sizing | Source |
|---|---|---|
| 7500 | | Abaris |
| 1581 | 627 (proprietary silane) | Abaris |
| 7781 | 497A (proprietary silane) | BGF |
| 7781 | 627 (proprietary silane) | BGF |
| 120 | 497A (proprietary silane) | BGF |
| 120 | 627 (proprietary silane) | BGF |

The weave of the fiber is a factor in the wetability of the resin, its drapeability, as well as a determiner in the penetrability of the ultraviolet light, affecting the curing of the resin. Fiberglass with a 1581 or 7781 satin weave provided a tight weave (57×54 yarns per inch count for both types) and sufficient thickness (0.0099" for 1581 and 0.0089" for 7781). The construction is specified as, warp ECG (electrical glass, continuous filament, filament diameter of $3.6 \times 10^{-3}$ inches) 1501/2 with a breaking strength of 198 lbs./inch and in the fill direction or roll width ECG 1501/2 with a breaking strength of 175 lbs./inch. The fiberglass may be employed in an amount of from about 20 to about 80 percent by weight, in one embodiment from about 50 to about 70 percent by weight, based on the final total weight of the composition including the fiberglass.

A typical UV curable composition of this invention may include about 10 to about 50 parts by weight of one or more oligomers, about 20 to about 60 parts by weight of one or more monomers, about 0.5 to about 3 parts by weight of one or more photoinitiators, from 0.01 to 1 part by weight of organic peroxide, from 0.1 to 3 parts by weight of dialkylaniline, and from about 25 to about 75 parts by weight of filler.

Ultraviolet Equipment and Measuring Devices

This invention may use an ultraviolet light source (such as Honle UVASPOT 400/T) as well as a radiometer (such as EIT Powermap) with which to measure the transmittance of the UV light through the sample composite to aid in maximizing the cure rate and percent cure. Suitable UV sources may also include those manufactured by Phillips Corporation, HPM high pressure halide lamps, HPA medium pressure metal halide lamps, HPR high pressure mercury vapor lamps, generally having a wavelength of 300 to 450 nanometers (nm). A chamber may be constructed out of UV absorbing Plexiglas to protect observers from UV radiation. The intensity of the UV light can be adjusted by adjusting the height of the lamp above the sample within the chamber.

Cured Compositions

The cured compositions of this invention have a $T_g$ above 150° C., typically have a $T_g$ above 155° C., and in one embodiment have a $T_g$ above 175° C. The Tg of the laminate was determined using dynamic mechanical analysis and the Tg identified as the peak of the tan delta at a frequency of 1 hertz, ASTM E1640. The cured compositions of this invention may be characterized as having an elastic modulus generally greater than 2,000 psi, more typically greater than 2,500 psi, and in one embodiment greater than 3,000 psi, as determined by a four-point bend on an Instron instrument according to ASTM D6272. The cured compositions of this invention typically have the water absorptions less than 0.5 percent, and in one embodiment less than 0.3 percent, as determined using ASTM D570.

Additional Components

The composition of this invention may also include a variety of additional filler materials, which, may impart additional structural integrity to the cured composition or to add some other property. Representative non-limiting examples of such fillers include inorganic fillers such as glass, silica, talc, gypsum, metal oxides, calcium carbonate, and the like.

Depending on compatibility, the composition may include minor amounts of, or be devoid of, other components, such as but no limited to light stabilizers, antioxidants, pigments, and so on.

The following examples illustrate the instant invention but are not intended to limit the scope of the invention or claims thereof. Unless indicated otherwise, all percentages are by weight. The formulations in the examples below have excellent adhesion to a variety of substrates and are free of hazardous air pollutants.

Example

In this example, the composite panels were prepared using a wet lay up technique with four plies of carbon fabric consolidated using vacuum bagging, and curing with exposure to a UVA source for sixty minutes. The composite samples dynamic performance was characterized using a dynamic mechanical analyzer at 1 Hz, over a wide temperature range. Good adhesion to primed aluminum and steel, resistance to aircraft fluids, high $T_g$, interlaminar shear properties, resin content, and repair fatigue durability were noted for these laminates.

A formulation used is shown in the following table.

| | Weight G | Weight Percentage |
|---|---|---|
| Component A | | |
| CN151 | 43.10 | 42.76 |
| SR368 | 20.57 | 20.41 |
| SR423A | 12.86 | 12.76 |
| Methyl Methacrylate | 7.71 | 7.65 |
| Methacrylic Acid | 10.28 | 10.20 |
| CN 975 | 4.98 | 4.94 |
| Irgacure 2022 | 0.50 | 0.50 |
| Benzoyl Peroxide | 0.80 | 0.79 |
| Total | 100.8 | 100 |
| Component B | | |
| CN151 | 43.10 | 43.06 |
| SR368 | 20.57 | 20.55 |
| SR423A | 12.86 | 12.85 |
| Methyl Methacrylate | 7.71 | 7.70 |
| Methacrylic Acid | 10.28 | 10.27 |
| CN 975 | 4.98 | 4.98 |
| Irgacure 2022 | 0.50 | 0.50 |
| Dimethylaniline | 0.10 | 0.10 |
| Total | 100.0 | 100 |

Mix A to B - 1 to 1 by weight

Carbon fabric Style 3K-135-H8 was used in performing wet resin lay-up with photo initiators with low levels of benzoyl peroxide and accelerator. Following the standard sixtyminute exposure, all of the four layers cured. A one to one by weight, two component resin system was used.

The bagging scheduled used for the composite specimens is as follows: Working upwards from the mold the layup consisted of a metal plate, Mylar™ film release surface, the four layers of Carbon fabric resin soaked layup, a Teflon™ release film a layer of the 234 TFP, a layer of style 120 fiberglass, followed by "P3" perforated Teflon™ film. Next, another layer of style 120 fiberglass, a non-porous Nylon 6/6 separator film, a layer of style 120 breather cloth, and the Nylon™ vacuum bag.

The composition was debulked for five minutes at 18 inches Hg, and cured for 60-minutes under UVA light.

The ultraviolet light source was a (Honle UVASPOT 400/T) lamp. The intensity of the UV light can be adjusted by adjusting the height of the lamp above the sample. In this example, a six inch height was used.

Cure of these composite samples is complete after sixty minutes of exposure to ultraviolet radiation (UVA) under vacuum. The vacuuming of the composite sample serves two purposes it removes oxygen from the system that can inhibit the free radical polymerization process and result in incomplete cure and secondly insures that no microvoids are in the composites. The microvoids can serve as sites of crack initiation.

Figure 2:
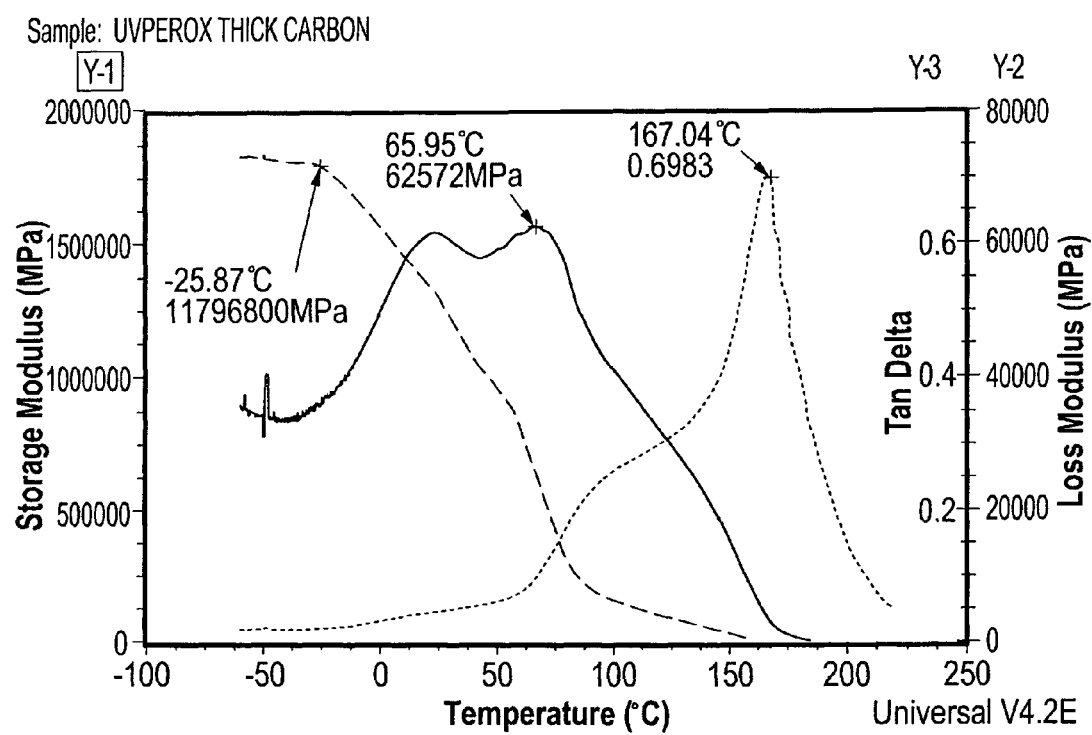
FIG. 2 illustrates the dynamic mechanical analysis for glass transition temperature of a thick carbon fiber composite which had a tan delta peak at 167° C.

Glass transition temperatures were determined using dynamic mechanical analysis (DMA), in which the mechanical response of the composite sample is measured as it is deformed under periodic stress as the temperature is elevated. The response of the sample to heating changes dramatically once the $T_g$ is reached and the sample softens. The $T_g$ is identified on the plot by the peak of the tan delta which is the Young's loss modulus divided by the Young's storage modulus. Typical sample sizes are 50 mm×12 mm×2.5 mm. The dynamic mechanical spectrum are shown in FIGS. 1 and 2 for a Kevlar™ composite and a carbon fiber composite, respectively.

Further modifications and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms of the invention herein shown and described are to be taken as illustrative embodiments. Equivalent elements or materials may be substituted for those illustrated and described herein, and certain features of the invention may be utilized independently of the use of other features, all as would be apparent to one skilled in the art after having the benefit of this description of the invention.

What is claimed is:

1. A method which comprises: combining an acrylic oligomer, an acrylic monomer, an organic peroxide, a dialkylaniline promoter, and a photoinitiator to provide an ultraviolet light (UV) curable formulation; applying the ultraviolet light (UV) curable formulation to a filler layer that is opaque to UV light to thereby form an ultraviolet light curable product having ultraviolet light curable formulation beneath the opaque filler layer; and irradiating the ultraviolet light curable product with UV light from above the opaque filler layer to cause curing of the formulation beneath the opaque filler layer to fully cure the UV curable product.

2. The method of claim 1, wherein the organic peroxide is benzoyl peroxide and the dialkylaniline promoter is dimethylaniline.

3. The method of claim 1, wherein the amount of the organic peroxide is from 0.3 to 0.5 percent by weight of the total weight of the acrylic oligomer, acrylic monomer, organic peroxide, dialkylaniline promoter, and photoinitiator.

4. The method of claim 1, wherein the amount of the dialkylaniline promoter is from 0.01 to 0.1 percent by weight of the total weight of the acrylic oligomer, acrylic monomer, organic peroxide, dialkylaniline promoter, and photoinitiator.

5. The method of claim 1, further comprising applying a vacuum to the ultraviolet light curable product to remove oxygen while irradiating the ultraviolet light curable product with UV light to fully cure the UV curable product in the absence of oxygen.

6. The method of claim 1, wherein the amount of organic peroxide is from 0.01 to 1 percent by weight of the total weight of the acrylic oligomer, acrylic monomer, organic peroxide, dialkylaniline promoter, and photoinitiator; and wherein the amount of dialkylaniline is from 0.01 to 0.25 percent by weight of the total weight of the acrylic oligomer, acrylic monomer, organic peroxide, dialkylaniline promoter, and photoinitiator.

7. The method of claim 1, further comprising storing the ultraviolet light curable formulation at ambient temperature before the steps of applying the ultraviolet light curable formulation to an opaque filler; and irradiating the ultraviolet light curable product with UV light to cause curing of the ultraviolet light curable formulation.

8. The method of claim 1, where the opaque filler comprises Kevlar fabric.

9. The method of claim 1, where the opaque filler comprises carbon fabric.

10. The method of claim 1, further comprising forming the ultraviolet light curable product on a metal plate prior to the step of irradiating the ultraviolet light curable product with UV light from above the opaque filler layer to cause curing of the formulation above the metal plate and beneath the opaque filler layer to fully cure the UV curable product.

11. The method of claim 1, further comprising forming the ultraviolet light curable product on a structure comprising aluminum prior to the step of irradiating the ultraviolet light curable product with UV light from above the opaque filler layer to cause curing of the formulation above the structure and beneath the opaque filler layer to fully cure the UV curable product.

12. The method of claim 1, further comprising forming the ultraviolet light curable product on an aircraft structure prior to the step of irradiating the ultraviolet light curable product with UV light from above the opaque filler layer to cause curing of the formulation above the aircraft structure and beneath the opaque filler layer to fully cure the UV curable product.

13. The method of claim 1, further comprising forming the ultraviolet light curable product on aluminum or steel prior to the step of irradiating the ultraviolet light curable product with UV light from above the opaque filler layer to cause curing of the formulation above the aluminum or steel and beneath the opaque filler layer to fully cure the UV curable product.

14. A method of repairing a hole in the exterior of an aircraft, comprising:
applying alternating layers of (1) an ultraviolet light curable formulation and (2) a filler fabric that is opaque to UV light to fill the hole and to form an ultraviolet light curable product having ultraviolet light curable formulation between opaque filler layers;
creating a vacuum across at least one side of the ultraviolet light curable product;
irradiating the ultraviolet light curable product with ultraviolet light while vacuum is maintained across the at least one side of the ultraviolet light curable product to cause curing of the formulation between the opaque filler layers to produce a fully cured product; and removing the vacuum, wherein the ultraviolet curable formulation comprises an acrylic oligomer, an acrylic monomer, an organic peroxide, a dialkylaniline promoter, and a photoinitiator.

15. The method of claim 14, wherein the organic peroxide is benzoyl peroxide and the dialkylaniline promoter is dimethylaniline.

16. The method of claim 14, wherein the amount of organic peroxide is from 0.3 to 0.5 percent by weight of the total weight of the acrylic oligomer, acrylic monomer, organic peroxide, dialkylaniline promoter, and photoinitiator, and wherein the amount of dialkylaniline is from 0.01 to 0.1 percent by weight of the total weight of the acrylic oligomer, acrylic monomer, organic peroxide, dialkylaniline promoter, and photoinitiator.

17. The method of claim 14, where the opaque filler comprises Kevlar fabric.

18. The method of claim 14, where the opaque filler comprises carbon fabric.

19. The method of claim 14, wherein the amount of organic peroxide is from 0.01 to 1 percent by weight of the total weight of the acrylic oligomer, acrylic monomer, organic peroxide, dialkylaniline promoter, and photoinitiator; and wherein the amount of dialkylaniline is from 0.01 to 0.25 percent by weight of the total weight of the acrylic oligomer, acrylic monomer, organic peroxide, dialkylaniline promoter, and photoinitiator.

20. The method of claim 14, further comprising storing the ultraviolet light curable formulation at ambient temperature before the steps of applying, creating and irradiating.

21. The method of claim 14, where the step of applying further comprises applying the alternating layers of (1) an ultraviolet light curable formulation and (2) a filler fabric that is opaque to UV light on a structure of the aircraft to fill the hole and to form an ultraviolet light curable product having ultraviolet light curable formulation above the aircraft structure and between the opaque filler layers prior to the step of creating; and where the step of irradiating further comprises irradiating the ultraviolet light curable product with ultraviolet light from above the opaque filler layers while vacuum is maintained across the at least one side of the ultraviolet light curable product to cause curing of the formulation above the aircraft structure and between the opaque filler layers to produce a fully cured product.

22. The method of claim 14, where the step of irradiating further comprises irradiating the ultraviolet light curable product with ultraviolet light from above the opaque filler layers while vacuum is maintained across the at least one side of the ultraviolet light curable product to cause curing of the formulation between the opaque filler layers to produce a fully cured product.

* * * * *